(12) United States Patent
Teshigahara et al.

(10) Patent No.: US 8,006,563 B2
(45) Date of Patent: Aug. 30, 2011

(54) SURFACE ACOUSTIC WAVE PRESSURE SENSOR

(75) Inventors: Akihiko Teshigahara, Nisshin (JP);
Hideaki Yamada, Nisshin (JP)

(73) Assignee: Denso Corporation, Kariya (JP)

( * ) Notice: Subject to any disclaimer, the term of this patent is extended or adjusted under 35 U.S.C. 154(b) by 43 days.

(21) Appl. No.: 12/656,209

(22) Filed: Jan. 21, 2010

(65) Prior Publication Data

US 2010/0186514 A1    Jul. 29, 2010

(30) Foreign Application Priority Data

Jan. 26, 2009  (JP) ................. 2009-013853

(51) Int. Cl.
*G01L 11/04* (2006.01)
(52) U.S. Cl. .................................... 73/702
(58) Field of Classification Search ............ None
See application file for complete search history.

(56) References Cited

U.S. PATENT DOCUMENTS

| | | | |
|---|---|---|---|
| 6,907,787 B2 * | 6/2005 | Cook et al. ............... 73/700 |
| 7,247,969 B2 * | 7/2007 | Nakaso et al. ............ 310/313 R |
| 7,594,445 B2 | 9/2009 | Hirabayashi et al. | |
| 7,757,571 B2 | 7/2010 | Hirabayashi et al. | |
| 2005/0077982 A1 * | 4/2005 | Funasaka ............... 333/195 |
| 2005/0122188 A1 * | 6/2005 | Funasaka et al. ......... 333/193 |
| 2007/0089525 A1 * | 4/2007 | Momose et al. ............ 73/753 |
| 2007/0247021 A1 * | 10/2007 | Nakaso et al. ............ 310/313 R |
| 2007/0247022 A1 * | 10/2007 | Nakaso et al. ............ 310/313 R |
| 2008/0202249 A1 | 8/2008 | Yokura et al. | |
| 2009/0301226 A1 | 12/2009 | Hirabayashi et al. | |

FOREIGN PATENT DOCUMENTS

| | | |
|---|---|---|
| JP | A-61-080024 | 4/1986 |
| JP | U-62-104131 | 7/1987 |
| JP | A-2004-203165 | 7/2004 |
| JP | A-2007-114094 | 5/2007 |
| JP | A-2007-232707 | 9/2007 |
| JP | A-2007-256080 | 10/2007 |
| JP | 2009222589 A * | 10/2009 |
| JP | 2009281975 A * | 12/2009 |

OTHER PUBLICATIONS

Office Action mailed on Dec. 7, 2010 issued from the Japan Patent Office in the corresponding Japanese patent application No. 2009-013853 (and English translation).

* cited by examiner

*Primary Examiner* — Andre J Allen
(74) *Attorney, Agent, or Firm* — Posz Law Group, PLC

(57) ABSTRACT

A sensor chip has a substrate and a comb-teeth electrode arranged on the substrate. The sensor chip is fixed to a diaphragm structure to be distorted by receiving pressure, and is fixed to the diaphragm structure only through a predetermined fix area so as to detect the pressure. The fix area is defined on only a part of the sensor chip opposing to the diaphragm structure. The sensor chip is restrained by the diaphragm structure in a direction of transmitting surface acoustic wave. Flexibility of the sensor chip in a perpendicular direction approximately perpendicular to the wave transmitting direction is larger than that in the transmitting direction.

11 Claims, 15 Drawing Sheets

POSITION ON SENSOR CHIP

SURFACE ACOUSTIC WAVE PRESSURE SENSOR

CROSS REFERENCE TO RELATED APPLICATION

This application is based on Japanese Patent Application No. 2009-13853 filed on Jan. 26, 2009, the disclosure of which is incorporated herein by reference in its entirety.

BACKGROUND OF THE INVENTION

1. Field of the Invention

The present invention relates to a pressure sensor using a surface acoustic wave element.

2. Description of Related Art

JP-A-61-80024 discloses a pressure sensor using a surface acoustic wave (SAW) element. A substrate to generate surface acoustic wave has a diaphragm part, and a comb-teeth electrode is arranged on the diaphragm part as a resonator. When a pressure is applied to the diaphragm part, a surface stress of the diaphragm part is varied, such that an acoustic velocity is varied. Further, a variation of an electrode interval of the electrode changes a resonation frequency of the resonator. The applied pressure can be detected by the change of the resonation frequency.

JP-A-2008-185460 or JP-A-2007-114094 discloses a pressure sensor using a strain gauge sensor chip without the SAW element. A pressure sensor disclosed in JP-A-2008-185460 has a sensor chip mounted to a diaphragm part to receive and detect pressure. A pressure sensor disclosed in JP-A-2007-114094 has a diaphragm part, a pressure transmitting part and a strain part. Pressure received by the diaphragm part is transmitted to the strain part through the pressure transmitting part, and a sensor chip is mounted to the strain part, not to the diaphragm part.

The strain gauge sensor chip of the pressure sensor disclosed in JP-A-2008-185460 or JP-A-2007-114094 is changed to a SAW element sensor chip so as to provide a prototype pressure sensor.

The prototype pressure sensor is shown in FIGS. 28 and 29.

A pressure sensor J1 shown in FIG. 29 includes a diaphragm part J2, a sensor chip J3 and an adhesion layer J4. The sensor chip J3 is mounted to a top face of the diaphragm part J2 opposite from a pressure-receiving face. All back face area J4a of the sensor chip J3 shown in a hatched area of FIG. 28 is fixed to the diaphragm part J2 through the adhesion layer J4. The area J4a corresponds to an area on which the adhesion layer J4 is arranged.

The sensor chip J3 has a SAW element defined by a substrate J5 and a comb-teeth electrode J6 arranged on the substrate J5, so as to generate surface acoustic wave. The substrate J5 is made of a 128° Y-cut X-direction-propagating lithium niobate substrate.

The comb-teeth electrode J6 is arranged on the sensor chip J3 in a manner that a resonator is defined by the SAW element. A pressure is detected by a variation of a resonation frequency, similarly to the pressure sensor disclosed in JP-A-61-80024.

Specifically, when the diaphragm part J2 receives pressure in an arrow direction of FIG. 29, stress is generated to a top face of the diaphragm part J2 in a radial direction and a circumferential direction. Stress distribution is formed to be symmetric with respect to a center point of the diaphragm part J2.

At this time, because all the back face of the sensor chip J3 is bonded to the diaphragm part J2, the sensor chip J3 is restrained to the diaphragm part J2 uniformly in all the direction. Therefore, the same stress is applied to the sensor chip J3 as the diaphragm part J2.

As shown in arrow directions of FIG. 28, the stress is resolved into a SAW transmitting direction stress P1 defined in a direction of transmitting surface acoustic wave, and a perpendicular direction stress P2 defined in a direction perpendicular to the transmitting direction. A resonation frequency f is defined by dividing an acoustic velocity v by a resonation period 2L (f=v/2L), in which L represents an electrode interval.

Therefore, when the diaphragm part J2 receives pressure, a variation Δf of the resonation frequency of the sensor chip J3 is a sum of a variation ΔL of the electrode interval L, a variation ΔV1 of the acoustic velocity due to the SAW transmitting direction stress P1, and a variation ΔV2 of the acoustic velocity due to the perpendicular direction stress P2 (Δf/f=ΔL/L+ΔV1/V+ΔV2/V), in which V represents an acoustic velocity of surface acoustic wave corresponding to a transmission speed.

However, a direction of the variation ΔV2 is opposite from directions of the variations ΔV1, ΔL. Therefore, pressure detecting sensitivity of the sensor chip J3 may be decreased, because the variation ΔV2 cancels the variations ΔV1, ΔL.

Specifically, when the diaphragm part J2 has a predetermined thickness, the SAW transmitting direction stress P1 is a tensile stress in the transmitting direction, and the perpendicular direction stress P2 is a tensile stress in the perpendicular direction, in all area of the diaphragm part J2.

Therefore, due to the tensile stress P1 in the transmitting direction, the electrode interval L is increased, such that the resonation frequency is lowered. Further, due to the tensile stress P1 in the transmitting direction, the acoustic velocity is lowered in the transmitting direction, such that the resonation frequency is further lowered.

In contrast, due to the tensile stress P2 in the perpendicular direction, the acoustic velocity is raised in the transmitting direction, such that the resonation frequency is raised. Therefore, stress detecting sensitivity may be decreased, because variations of the resonation frequency are canceled by each other.

As shown in FIG. 28, the electrode J6 is located at an approximately center position of the diaphragm part J2. Even when a position or direction of the electrode J6 is changed, the pressure detecting sensitivity is decreased.

When the SAW element is used as the resonator, pressure is detected by the variation of the resonation frequency. In contrast, when the SAW element is used as a filter element, pressure is detected by a variation of a delay time.

Similar disadvantage will be generated, if the SAW element is used as the filter element, because the variation of the acoustic velocity due the SAW transmitting direction stress P1 and the variation of the acoustic velocity due the perpendicular direction stress P2 have directions opposite from each other.

Similar disadvantage will be generated, if the substrate J5 is made of other substrate different from the 128° Y-cut X-direction-propagating lithium niobate substrate.

The above disadvantage is generated when all the face of the sensor chip J3 is bonded to the diaphragm part J2. Similarly, the above disadvantage will be generated in the pressure sensor disclosed in JP-A-61-80024. When the diaphragm part of the substrate receives pressure, the perpendicular direction stress P2 is applied to the diaphragm part, because stress is applied to the diaphragm part in a radial direction.

SUMMARY OF THE INVENTION

In view of the foregoing and other problems, it is an object of the present invention to provide a pressure sensor.

According to an example of the present invention, a surface acoustic wave pressure sensor includes a diaphragm structure and a sensor chip. The diaphragm structure has a diaphragm part to be distorted by receiving pressure. The sensor chip has a substrate to generate surface acoustic wave, and a comb-teeth electrode arranged on the substrate. The electrode transmits the wave through the substrate in a single wave transmitting direction. The sensor chip is fixed to the diaphragm structure through a predetermined fix area so as to detect the pressure received by the diaphragm part. The fix area is defined by only a part of the sensor chip opposing to the diaphragm structure. The sensor chip is restrained by the diaphragm structure in the wave transmitting direction. The sensor chip has flexibility in a direction approximately perpendicular to the wave transmitting direction. The flexibility in the perpendicular direction is larger than that in the wave transmitting direction.

Accordingly, pressure detecting sensitivity can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 2:
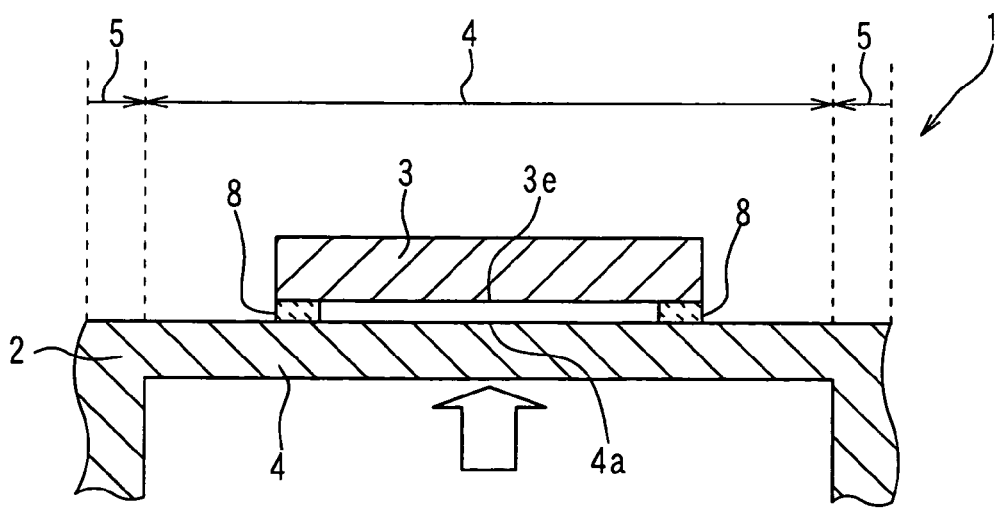
FIG. 2 is a cross-sectional view taken along line II-II of FIG. 1.

As shown in FIG. 2, a pressure sensor 1 includes a diaphragm structure 2 and a sensor chip 3. The sensor chip 3 is fixed to the diaphragm structure 2. For example, the pressure sensor 1 is used for detecting an engine combustion pressure.

Figure 1:
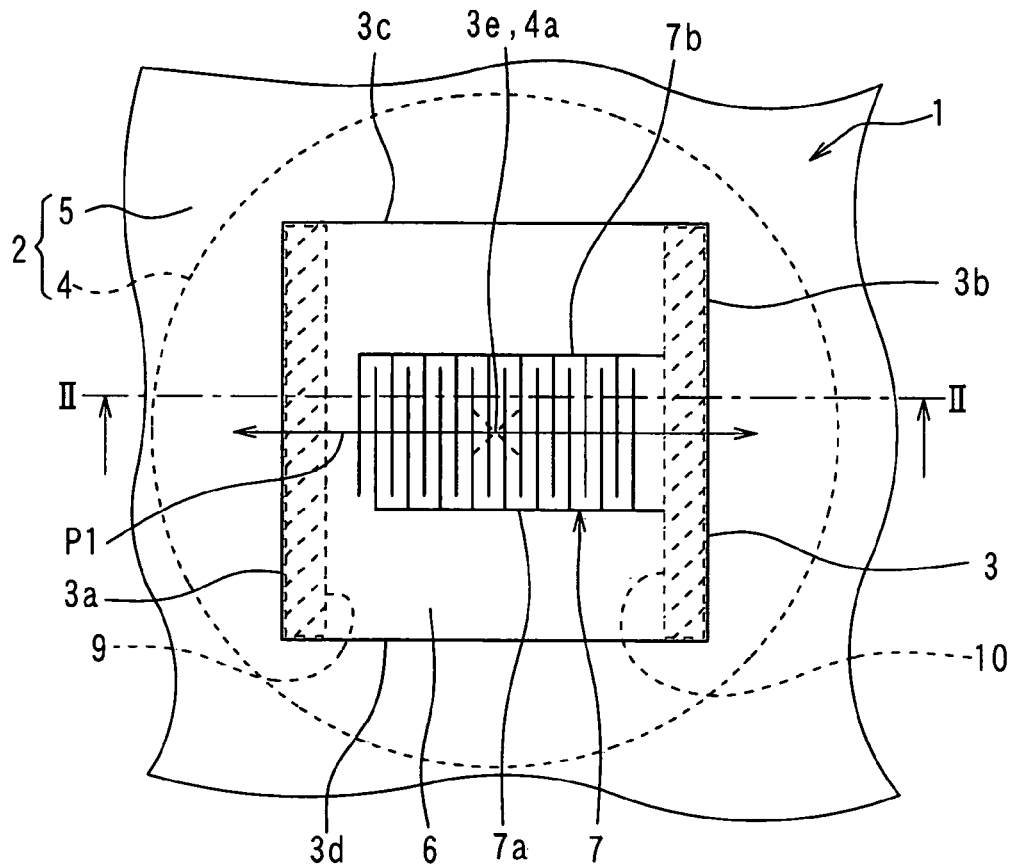
FIG. 1 is a schematic plan view illustrating a pressure sensor according to a first embodiment.

The diaphragm structure 2 made of metal, for example, has a diaphragm part 4 and a periphery part 5. The diaphragm part 4 is distorted by receiving pressure, and the periphery part 5 is located around a periphery of the diaphragm part 4. As shown in FIG. 1, the diaphragm part 4 has an approximately round outline. As shown in FIG. 2, a thickness of the periphery part 5 is larger than that of the diaphragm part 4. A distortion of the periphery part 5 is smaller than that of the diaphragm part 4, when the diaphragm part 4 receives pressure.

As shown in FIG. 1, the sensor chip 3 has a substrate 6 to generate surface acoustic wave (SAW), and a comb-teeth electrode 7 arranged on the substrate 6. Due to the comb-teeth electrode 7, surface acoustic wave is transmitted through the substrate 6 in a single direction. The substrate 6 is made of a 128° Y-cut X-direction-propagating lithium niobate substrate, for example. The electrode 7 is arranged in a manner that a SAW element operates as a resonator, and is constructed by a pair of electrodes 7a, 7b.

The electrodes 7a, 7b extend parallel to each other, and have plural comb-teeth parts. A direction of transmitting surface acoustic wave by the sensor chip 3 corresponds to a direction approximately perpendicular to a longitudinal direction of the comb-teeth part of the electrode 7. That is, the transmitting direction corresponds to a left-right direction of FIG. 1.

The sensor chip 3 has a rectangular shape smaller than the diaphragm part 4. The sensor chip 3 has a first parallel side 3a and a second parallel side 3b approximately parallel to the comb-teeth part of the electrode 7, and a first perpendicular side 3c and a second perpendicular side 3d approximately perpendicular to the comb-teeth part of the electrode 7.

The sensor chip 3 is arranged in an area of the diaphragm part 4. A center 3e of the sensor chip 3 is approximately equal to a center 4a of the diaphragm part 4, and the electrode 7 is located at the center 3e of the sensor chip 3.

As shown in FIG. 2, the sensor chip 3 is fixed to the diaphragm part 4 of the diaphragm structure 2 through an adhesion layer 8. The adhesion layer 8 is arranged in hatched fix areas 9, 10 of FIG. 1. That is, the adhesion layer 8 is arranged not all the area of the sensor chip 3 opposing to the diaphragm part 4.

The adhesion layer 8 is arranged only end portions of the sensor chip 3 adjacent to the parallel sides 3a, 3b. A longitudinal length of the adhesion layer 8 corresponds to a length of the parallel side 3a, 3b. That is, the fix areas 9, 10 fixed to the diaphragm structure 2 correspond to the end portions of the sensor chip 3 in the SAW transmitting direction. Further, the fix area 9, 10 extends in a direction approximately perpendicular to the SAW transmitting direction between the perpendicular sides 3c, 3d.

Figure 28:
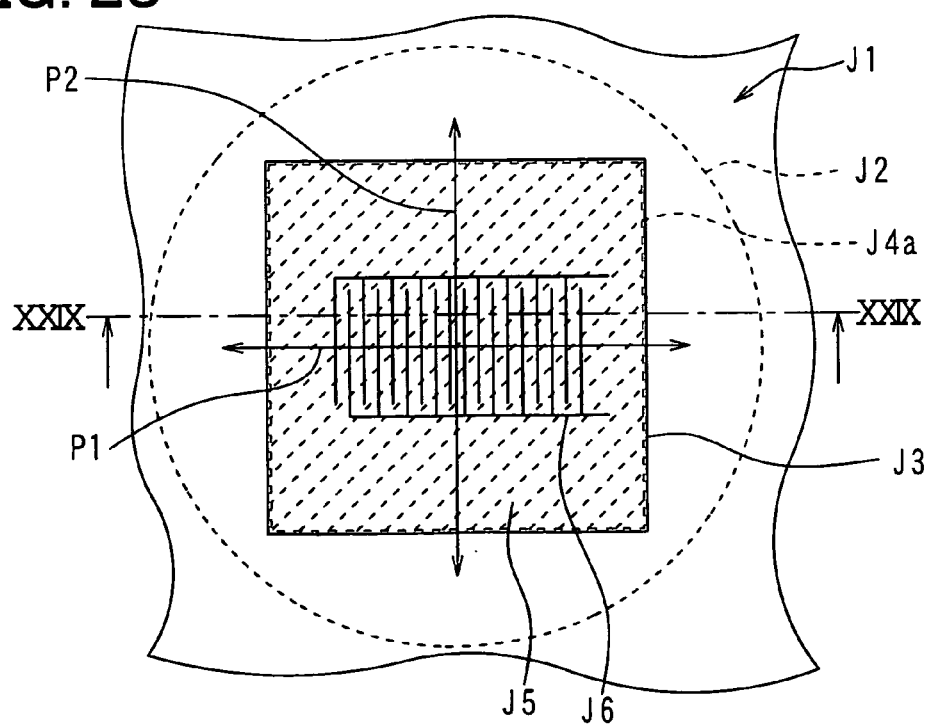
FIG. 28 is a schematic plan view illustrating a prototype pressure sensor.
Figure 29:
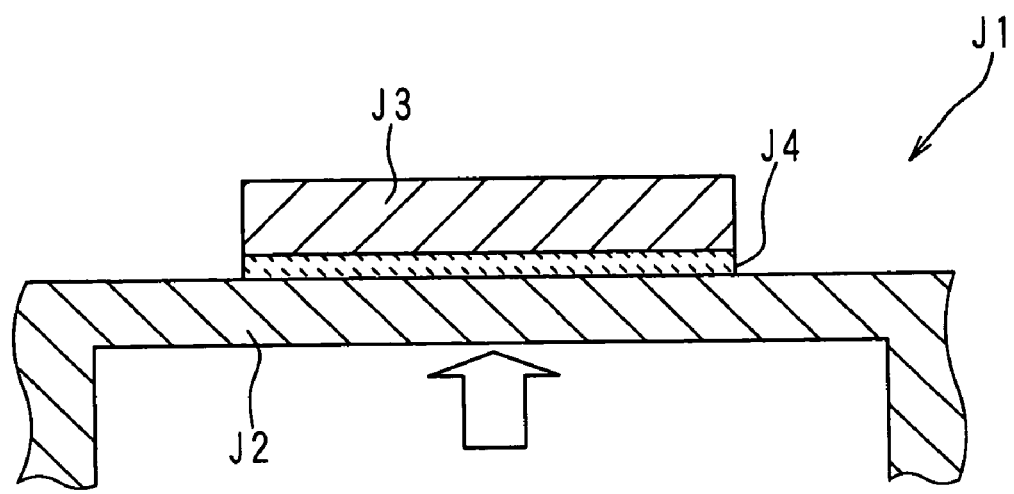
FIG. 29 is a cross-sectional view taken along line XXIX-XXIX of FIG. 28.

The sensor chip 3 of the pressure sensor 1 detects pressure received by the diaphragm part 4 in a blank arrow direction of FIG. 2, similarly to a sensor chip J3 of FIG. 28. For example, a driving circuit is connected to the electrodes 7a, 7b so as to construct an oscillator. The pressure received by the diaphragm part 4 is calculated by measuring a variation of an oscillation frequency of the oscillator.

When a pressure is applied to a lower side of the diaphragm part 4 in the blank arrow direction of FIG. 2, the diaphragm part 4 is deformed upward. A thickness of the adhesion layer 8 is set equal to or smaller than a deformation dimension of the diaphragm part 4. Therefore, the center 4a of the deformed diaphragm part 4 contacts the sensor chip 3. Because a back face of the sensor chip 3 is pressed upward, the sensor chip 3 is deformed.

Figure 3:
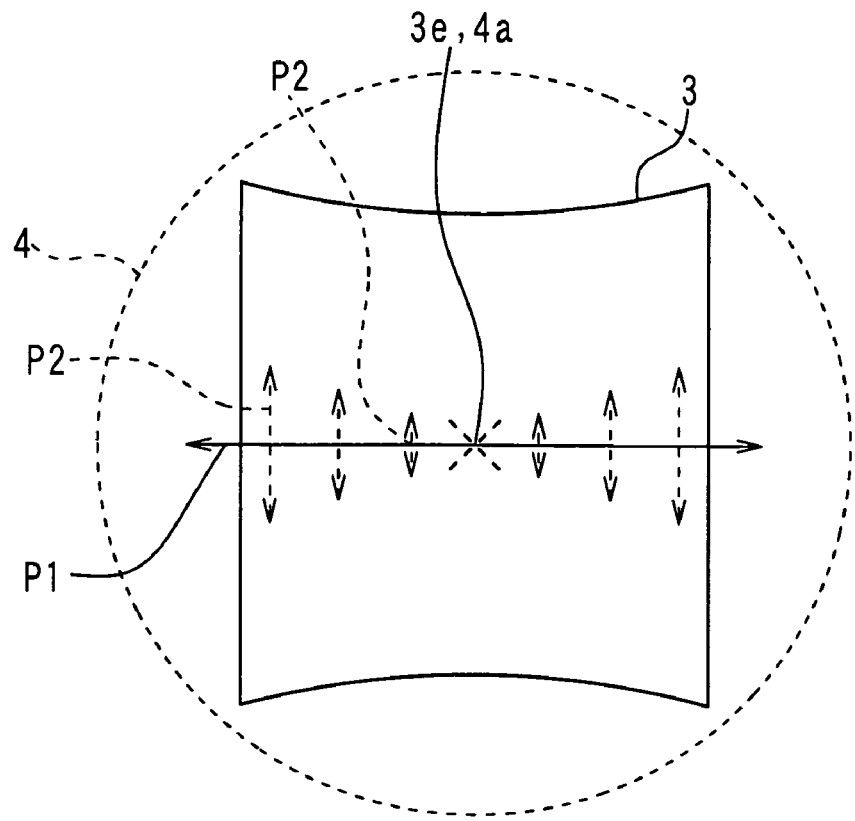
FIG. 3 is a schematic plan view illustrating a deformation of a sensor chip when the pressure sensor receives pressure.
Figure 4:
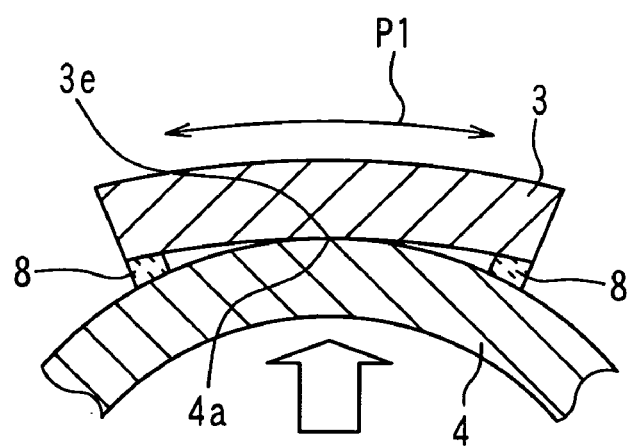
FIG. 4 is a schematic cross-sectional view illustrating the deformation of the sensor chip.

FIGS. 3 and 4 show the deformation of the sensor chip 3, when the diaphragm part 4 receives pressure. FIG. 3 corresponds to FIG. 1, and FIG. 4 corresponds to FIG. 2.

The fix area 9, 10 is located in the end portion of the sensor chip 3 in the SAW transmitting direction, and extends in the perpendicular direction perpendicular to the SAW transmitting direction. The other area of the sensor chip 3 other than the fix area 9, 10 is a non-fix area, in which the sensor chip 3 and the diaphragm part 4 are separated from each other. Thus, the sensor chip 3 has a beam shape, and ends of the beam shape are supported by the diaphragm part 4. Because a load is applied to the center 3e of the sensor chip 3, center-concentrated load is applied to the sensor chip 3 having the ends-supported beam shape.

The sensor chip 3 is restrained by the diaphragm structure 2 in the SAW transmitting direction, due to the fix areas 9, 10 located outside of the center 3e in the SAW transmitting direction. Therefore, as shown in FIGS. 3 and 4, the sensor chip 3 is deformed in accordance with the deformation of the diaphragm part 4. Thus, a SAW transmitting direction stress P1 is generated in the SAW transmitting direction relative to the sensor chip 3 in accordance with the deformation of the diaphragm part 4.

In contrast, the sensor chip 3 has a non-fix area located outside of the center 3e in the perpendicular direction perpendicular to the SAW transmitting direction. The sensor chip 3 and the diaphragm part 4 are separated from each other in the non-fix area, when the center 3e of the sensor chip 3 contacts the center 4a of the diaphragm part 4 in accordance with the deformation of the diaphragm part 4.

Therefore, the sensor chip 3 has flexibility relative to the diaphragm structure 2 in the perpendicular direction, compared with the SAW transmitting direction. The diaphragm structure 2 has a force of restraining the sensor chip 3, and the force is smaller in the perpendicular direction than in the SAW transmitting direction. Therefore, the perpendicular direction stress P2 can be restricted from being generated, because the deformation dimension of the sensor chip 3 is small in the perpendicular direction, as shown in FIG. 3.

According to the first embodiment, compared with the case in which the all the face of the sensor chip is fixed to the diaphragm structure, the force of the diaphragm structure 2 to restrain the sensor chip 3 is small in the perpendicular direction. Therefore, because the perpendicular direction stress P2 is reduced, the pressure detecting sensitivity of the sensor chip 3 can be improved.

A method of fixing the sensor chip 3 and the diaphragm structure 2 will be described with reference to FIGS. 5 and 6.

Figure 5:
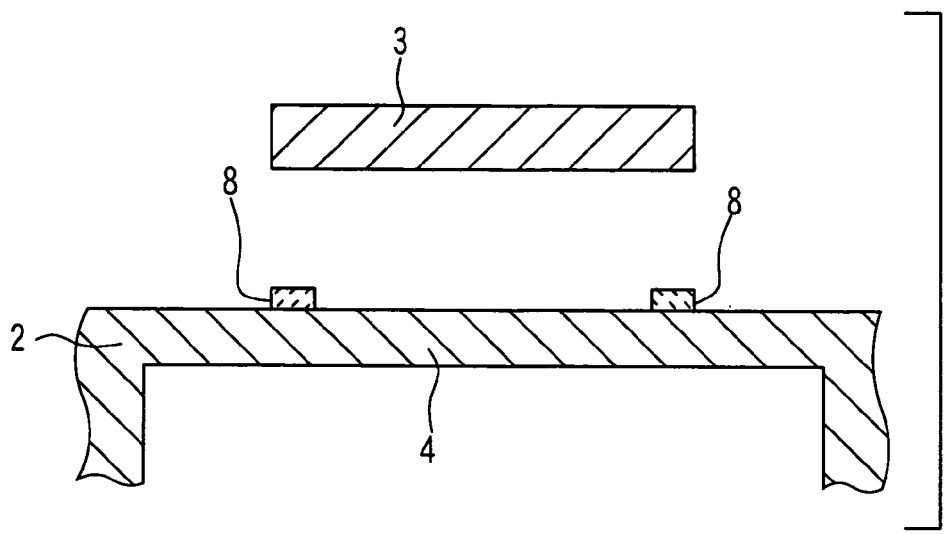
FIG. 5 is a schematic cross-sectional view illustrating a method of mounting the sensor chip to a diaphragm structure of the pressure sensor.
Figure 6:
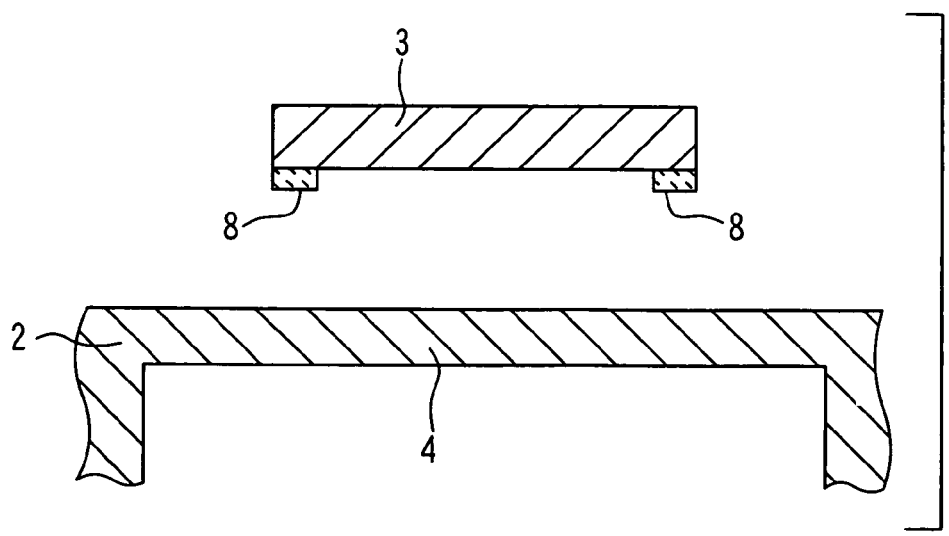
FIG. 6 is a schematic cross-sectional view illustrating another method of mounting the sensor chip to the diaphragm structure.

For example, as shown in FIG. 5, the adhesion layer 8 is formed in a predetermined area of a top face of the diaphragm part 4 to be bonded with the sensor chip 3. The adhesion layer 8 may be made of low-melting glass disclosed in JP-A-2008-185460. In this case, the low-melting glass is applied to the diaphragm part 4 by a screen printing, for example, so as to define a predetermined pattern of the adhesion layer 8. After the sensor chip 3 is mounted to the diaphragm part 4, heat treatment is performed. Thus, only the predetermined area of the sensor chip 3 is fixed to the diaphragm part 4.

The adhesion layer 8 is not limited to be made of the low-melting glass. Alternatively, a variety of adhesives may be used to form the pattern through the screen printing. The adhesion layer 8 is formed on the top face of the diaphragm part 4 in FIG. 5. Alternatively, as shown in FIG. 6, the adhesion layer 8 may be formed on the back face of the sensor chip 3.

Second Embodiment

A method of fixing a sensor chip 3 and a diaphragm structure 2 will be described with reference to FIGS. 7 and 8. The fixing method is changed in a second embodiment, compared with the first embodiment.

Figure 7:
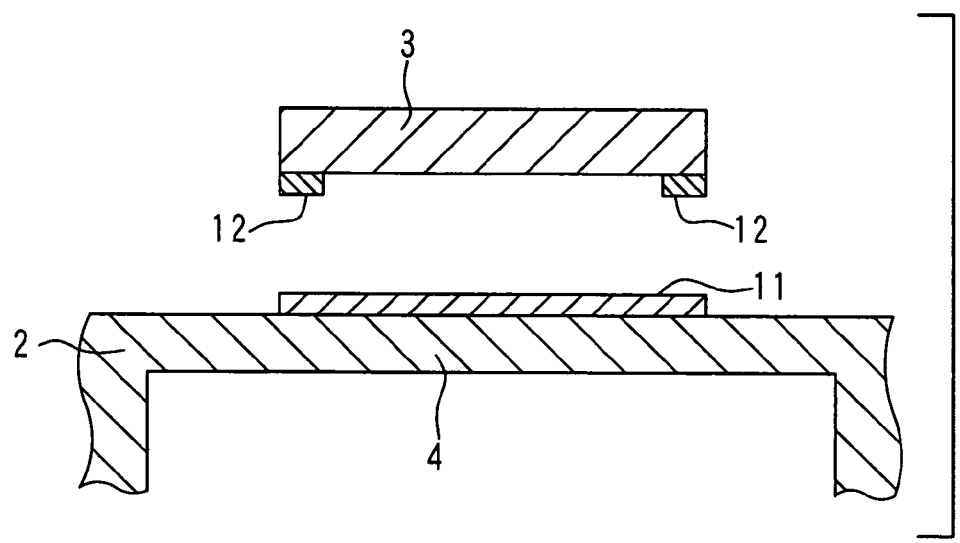
FIG. 7 is a schematic cross-sectional view illustrating a method of mounting a sensor chip to a diaphragm structure for a pressure sensor according to a second embodiment.

As shown in FIG. 7, a Au-film 11 is formed on a predetermined area of a top face of the diaphragm part 4, and a Au—Sn-film 12 is formed on a predetermined area of a back face of the sensor chip 3. The predetermined area of the diaphragm part 4 corresponds to an area opposing to the sensor chip 3. The predetermined area of the sensor chip 3 corresponds to an area to be fixed with the diaphragm part 4. The Au—Sn-film 12 having a predetermined pattern is formed at a predetermined position of the sensor chip 3 by using a photolithography for a semiconductor device.

Figure 8:
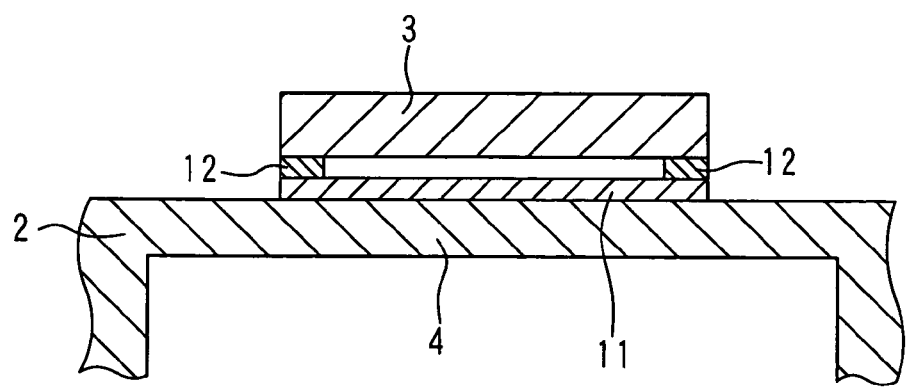
FIG. 8 is a schematic cross-sectional view illustrating another mounting method of the second embodiment.

As shown in FIG. 8, the Au-film 11 and the Au—Sn-film 12 are made contact with each other, and heat treatment is performed at a eutectic point such as 280° C. Thus, eutectic bonding can be made between the sensor chip 3 and the diaphragm part 4. The Au—Sn-film 12 is used as a eutectic bonding material. Alternatively, a Au—Si-film may be used as the eutectic bonding material.

Third Embodiment

A method of fixing a sensor chip 3 and a diaphragm structure 2 will be described with reference to FIGS. 9 and 10. The fixing method is changed in a third embodiment, compared with the first embodiment.

Only a part of the sensor chip 3 is fixed to the diaphragm part 4 by processing a back face shape of the sensor chip 3.

Figure 9:
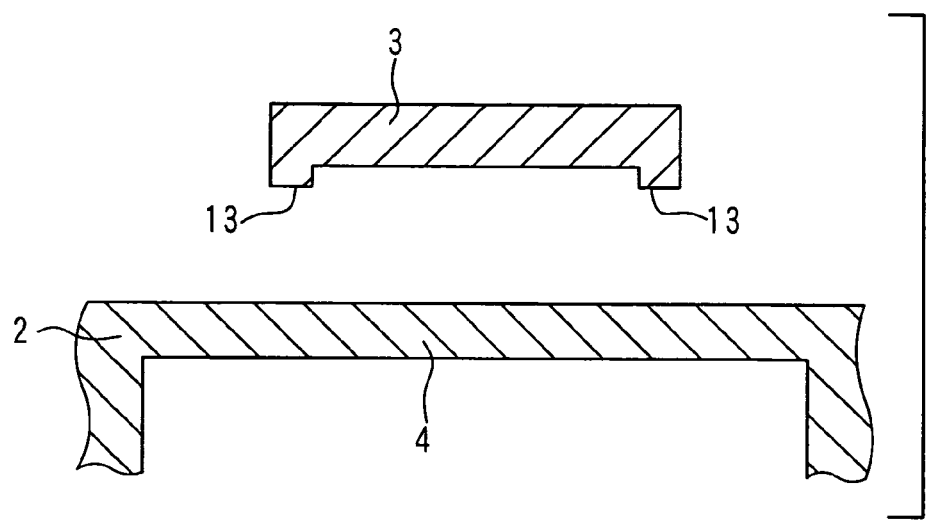
FIG. 9 is a schematic cross-sectional view illustrating a method of mounting a sensor chip to a diaphragm structure for a pressure sensor according to a third embodiment.
Figure 10:
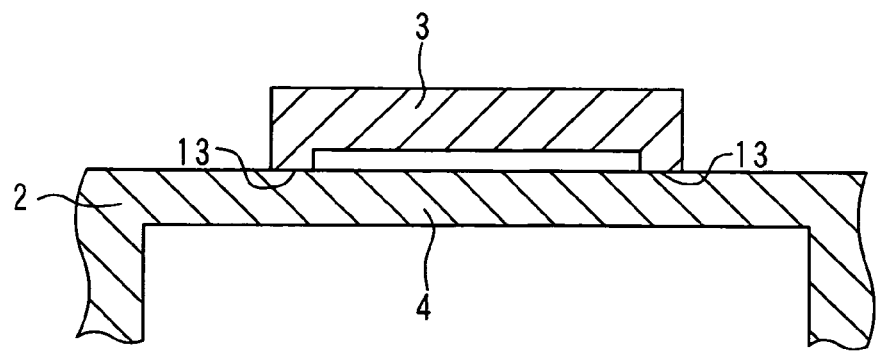
FIG. 10 is a schematic cross-sectional view illustrating another mounting method of the third embodiment.

As shown in FIG. 9, a back face of the sensor chip 3 is processed, such that only a fix area 13 is left. A sub-micron processing can be easily performed by using photolithography and etching for a semiconductor process, for example.

The fix area 13 is a protrusion protruding toward the diaphragm structure 2, and is located in the same area as the area 9, 10 of FIG. 1.

The sensor chip 3 is mounted on the top face of the diaphragm part 4, and the fix area 13 of the sensor chip 3 is directly bonded to the diaphragm part 4. The bonding may be performed by activating contact faces of the sensor chip 3 and the diaphragm part 4, for example, as disclosed in JP-A-2007-114094. Alternatively, a bonding-facilitating layer may be added on the sensor chip 3 and the diaphragm part 4. Alternatively, the sensor chip 3 and the diaphragm part 4 may be indirectly bonded to each other through an adhesion layer.

Fourth Embodiment

A fix position of a sensor chip 3 is changed in a fourth embodiment, compared with the first embodiment.

Figure 11:
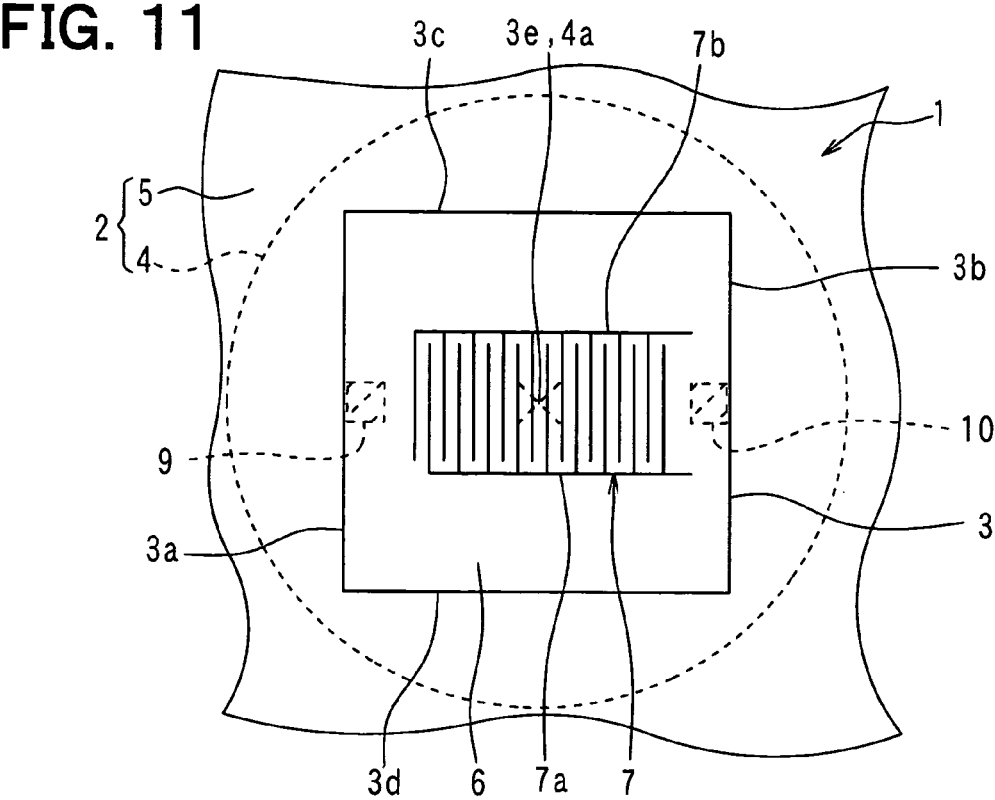
FIG. 11 is a schematic plan view illustrating a pressure sensor according to a fourth embodiment.

As shown in FIG. 11, fix areas 9, 10 are arranged on end portions of the sensor chip 3 in the SAW transmitting direction, and the fix areas 9, 10 are arranged only at an approximately center position of the sensor chip 3 in the perpendicular direction perpendicular to the SAW transmitting direction. The fix areas 9, 10 are arranged only at an approximately center position in a longitudinal direction of the sides 3a, 3b. For example, the fix area 9, 10 has a dot-shape, in which a dimension of the fix area 9, 10 in the SAW transmitting direction is approximately equal to that in the perpendicular direction.

In the first embodiment, as shown in FIG. 1, the fix area 9, 10 extends outward from the center position of the sensor chip 3 in the perpendicular direction. Therefore, when load is applied to the center 3e of the sensor chip 3, as shown in broken line arrows of FIG. 3, the perpendicular direction stresses P2 are generated on the sensor chip 3.

In contrast, in the fourth embodiment, the fix area 9, 10 is limited to be located at the center position in the perpendicular direction. Therefore, the perpendicular direction stresses P2 can be reduced.

According to the fourth embodiment, the pressure detecting sensitivity of the sensor chip 3 can be improved.

Fifth Embodiment

A fix position of a sensor chip 3 is changed in a fifth embodiment, compared with the first embodiment.

Figure 12:
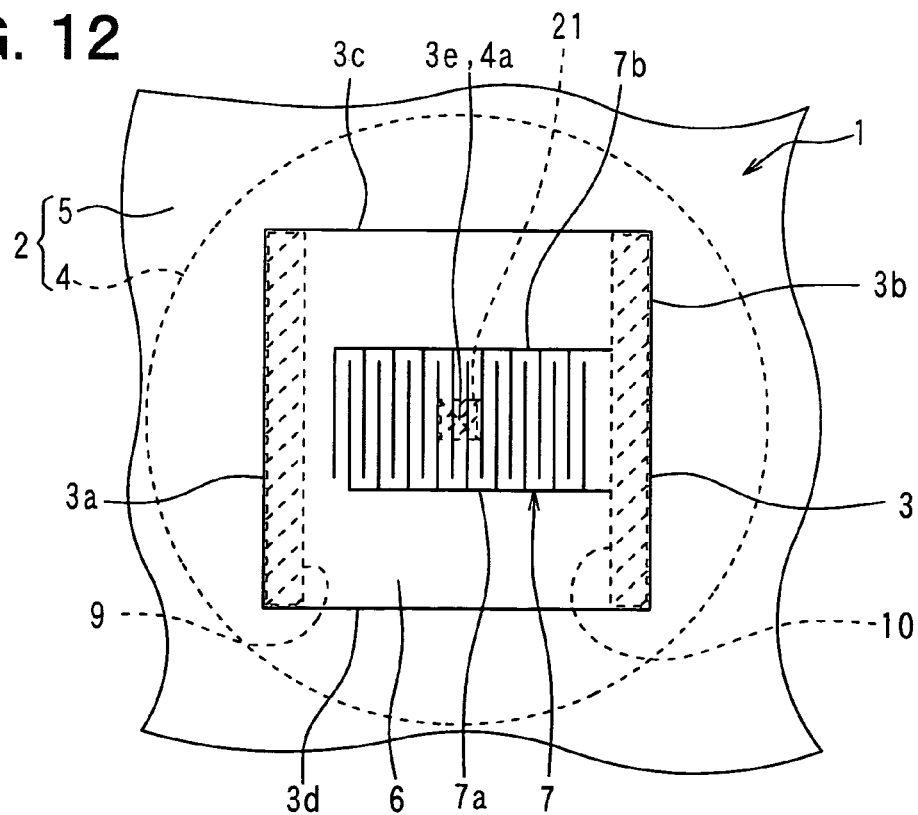
FIG. 12 is a schematic plan view illustrating a pressure sensor according to a fifth embodiment.

As shown in FIG. 12, the sensor chip 3 further has a fix area 21 located at an approximately center 3e of the sensor chip 3, in addition to the fix areas 9, 10. That is, the fix areas 9, 10, 21 are arranged in the end portions and the center portion of the sensor chip 3 in the SAW transmitting direction. The fix area 21 located in the center portion is located to correspond to the center 4a of the diaphragm part 4. For example, a dimension of the fix area 21 in the SAW transmitting direction is approximately equal to that in the perpendicular direction.

When the fix area 21 is arranged at the center 3e of the sensor chip 3, outside part of the sensor chip 3 other than the center 3e in the perpendicular direction is a non-fix area in which the sensor chip 3 and the diaphragm part 4 are separated from each other.

In the first embodiment, the fix area 21 is not arranged at the center 3e of the sensor chip 3. Therefore, in a case that the diaphragm part 4 is deformed by receiving pressure, when the deformation dimension becomes larger than a thickness of the adhesion layer 8, the center 3e of the sensor chip 3 is pushed upward by the diaphragm part 4.

However, if the pressure is too small to deform the diaphragm part 4, the center part of the diaphragm part 4 may not press the sensor chip 3. In this case, the sensor chip 3 is not deformed, and the sensor chip 3 may output no signal.

In contrast, in the fifth embodiment, the fix area 21 is arranged at the center 3e of the sensor chip 3 so as to correspond to the center 4a of the diaphragm part 4. Therefore, the center 3e is pushed upward by the diaphragm part 4 immediately after the diaphragm part 4 starts to be deformed.

According to the fifth embodiment, the sensor chip 3 is deformed even when the pressure is small. Thus, the pressure detecting sensitivity of the sensor chip 3 can be more improved.

Further, when the fix area 21 is not arranged at the center 3e of the sensor chip 3, a thickness of the adhesion layer 8 is necessary to be controlled in a manner that the diaphragm part 4 contacts the sensor chip 3 when pressure is received. Therefore, a material of the adhesion layer 8 and a method of forming the adhesion layer 8 are limited.

According to the fifth embodiment, the center 3e is pushed upward by the diaphragm part 4 immediately after the diaphragm part 4 starts to be deformed. Therefore, the thickness of the adhesion layer 8 is not limited. Thus, the material of the adhesion layer 8 and the method of forming the adhesion layer 8 can be selected from various choices.

Sixth Embodiment

A shape of the fix area 21 located at the center 3e of the sensor chip 3 is changed in a sixth embodiment, compared with the fifth embodiment.

Figure 13:
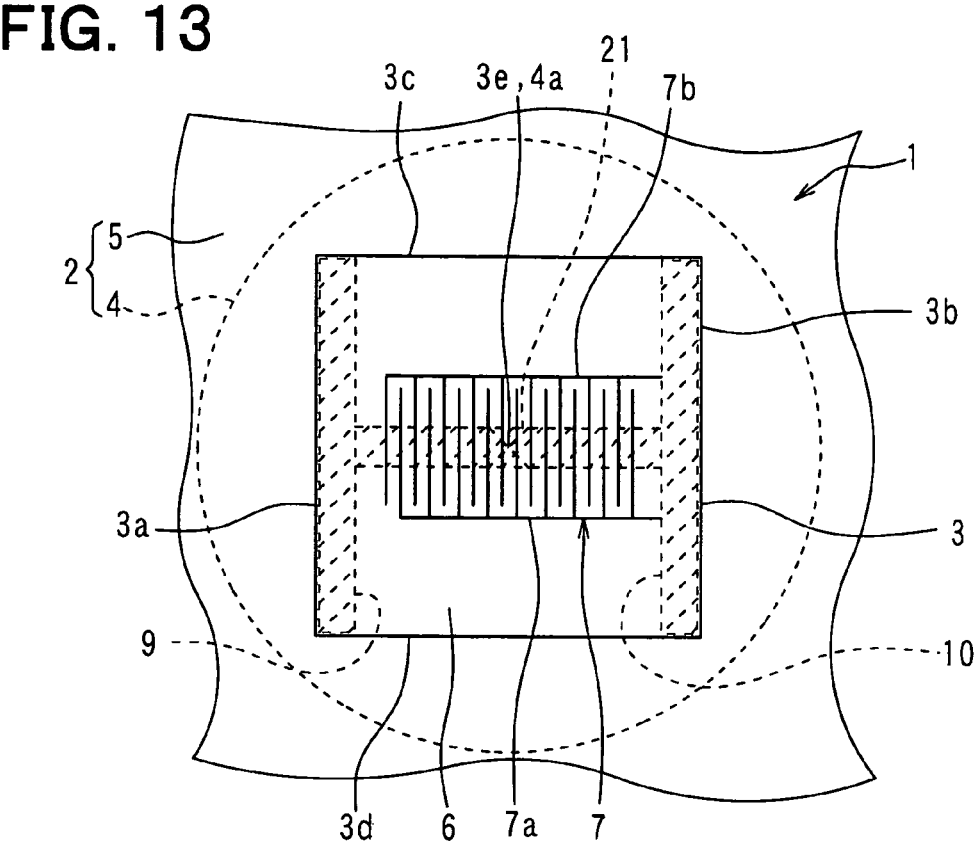
FIG. 13 is a schematic plan view illustrating a pressure sensor according to a sixth embodiment.

As shown in FIG. 13, the fix area 21 has a linear shape, which extends in the SAW transmitting direction and passes through the center 3e of the sensor chip 3. Further, the fix area 21 is connected to the fix area 9, 10 located in the end portions of the sensor chip 3 in the SAW transmitting direction.

According to the sixth embodiment, the fix area 21 is long and large in the SAW transmitting direction. Thus, pressure detecting reliability can be improved.

Seventh Embodiment

A fix position of a sensor chip 3 is changed in a seventh embodiment, compared with the first embodiment.

Figure 14:
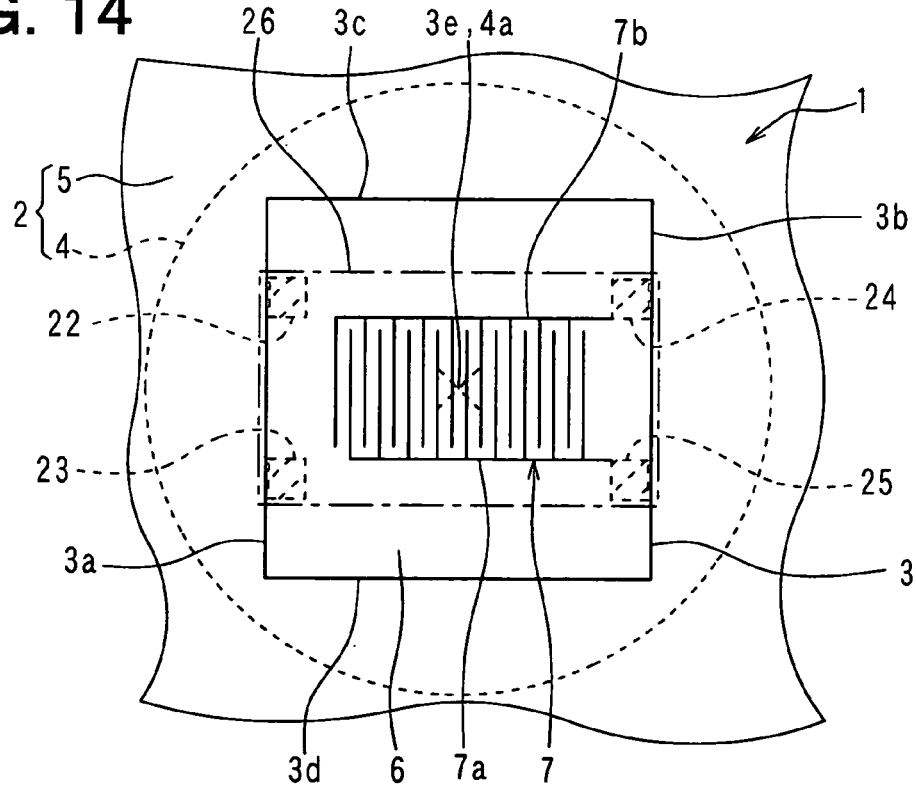
FIG. 14 is a schematic plan view illustrating a pressure sensor according to a seventh embodiment.

As shown in FIG. 14, fix areas 22, 23 are arranged on a first end portion of the sensor chip 3 in the SAW transmitting direction, and fix areas 24, 25 are arranged on a second end portion opposite from the first end portion. Specifically, two fix areas 22, 23 are arranged adjacent to a left side 3a of the sensor chip 3 parallel to the corn-teeth part, and two fix areas 24, 25 are arranged adjacent to a right side 3b of the sensor chip 3 parallel to the comb-teeth part. The fix areas 22, 23 are located outside of the center position in the perpendicular direction, and the fix areas 24, 25 are located outside of the center position in the perpendicular direction.

As shown in FIG. 14, an area 26 is defined to connect outlines of the fix areas 22, 23, 24, 25 so as to include all the fix areas 22, 23, 24, 25 on a face of the sensor chip 3 opposing to the diaphragm part 4. The fix areas 22, 23, 24, 25 are arranged in a manner that the area 26 has an elongated shape in the SAW transmitting direction.

According to the seventh embodiment, a force restraining the sensor chip 3 in the perpendicular direction is smaller than that in the SAW transmitting direction. Therefore, the perpendicular direction stress P2 applied to the sensor chip 3 can be reduced, and the pressure detecting sensitivity of the sensor chip 3 can be improved.

The number of the fix areas may be changed from four. For example, as shown in FIG. 11, the number of the fix areas may be two, and an area defined to connect outlines of the fix areas 9, 10 has an elongated shape in the SAW transmitting direction.

Eighth Embodiment

A fix position of a sensor chip 3 is changed in an eighth embodiment, compared with the first embodiment.

Figure 15:
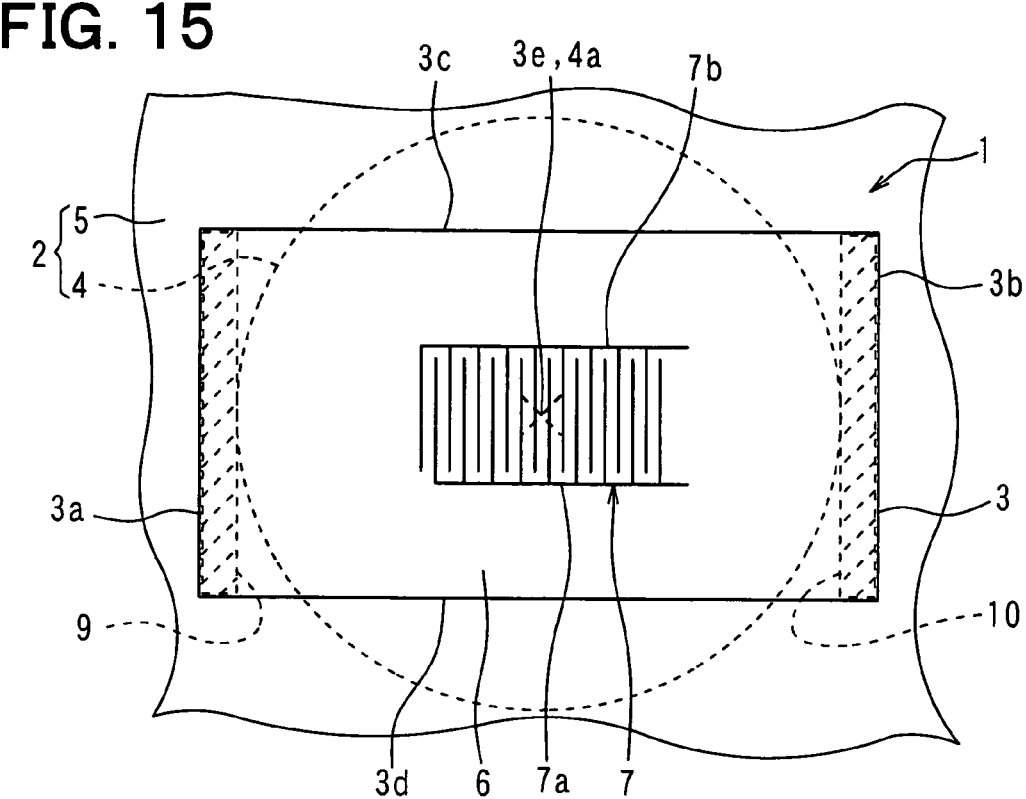
FIG. 15 is a schematic plan view illustrating a pressure sensor according to an eighth embodiment.

As shown in FIG. 15, the sensor chip 3 has a rectangular shape larger than the diaphragm part 4. The sensor chip 3 is arranged on both of the diaphragm part 4 and the periphery part 5 of the diaphragm structure 2. The fix areas 9, 10 located in the end portions of the sensor chip 3 in the SAW transmitting direction are positioned on the periphery part 5. The fix areas 9, 10 extend over the sensor chip 3 in the perpendicular direction.

The sensor chip 3 has a flexibility relative to the diaphragm structure 2 in the perpendicular direction. Therefore, the perpendicular direction stress P2 can be reduced, similarly to a case in which the fix areas 9, 10 are positioned on the diaphragm part 4.

Further, a deformation dimension of the periphery part 5 is smaller than that of the diaphragm part 4. Therefore, the perpendicular direction stress P2 can be much reduced, and the pressure detecting sensitivity of the sensor chip 3 can be improved.

The fix area 9, 10 may be arranged only at the center position in the perpendicular direction, similarly to the fourth embodiment.

Ninth Embodiment

Figure 16:
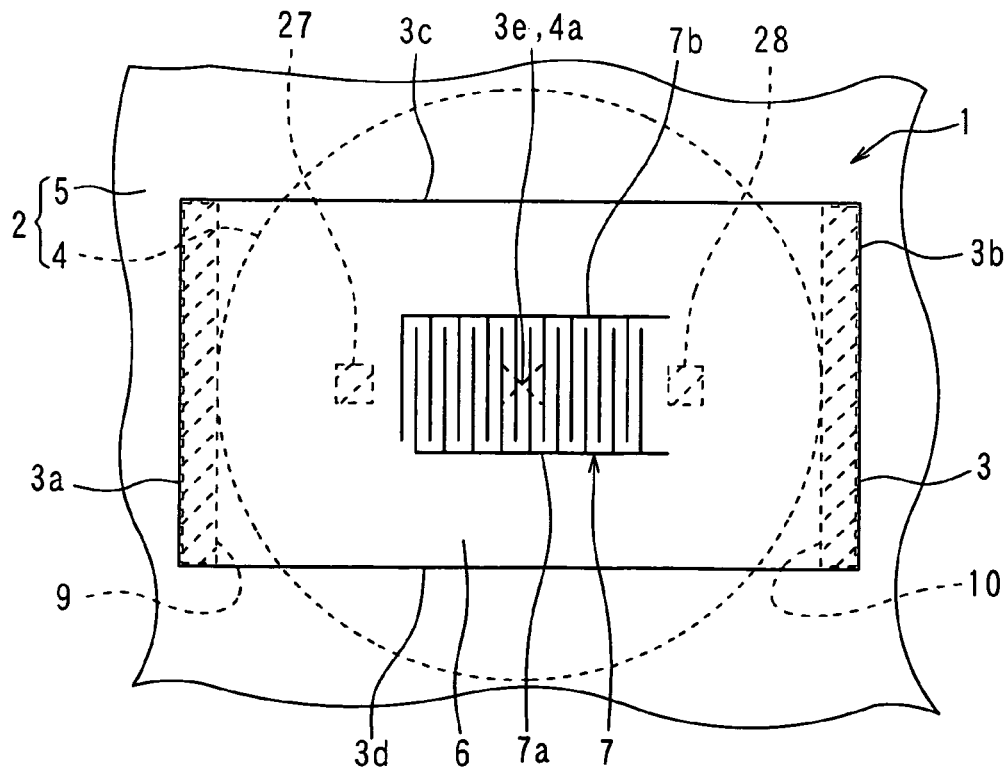
FIG. 16 is a schematic plan view illustrating a pressure sensor according to a ninth embodiment.

In a ninth embodiment, as shown in FIG. 16, a sensor chip 3 further has fix areas 27, 28 in addition to the fix areas 9, 10 of the eighth embodiment. The fix areas 27, 28 are located oppose to each other through the comb-teeth electrode 7 in the SAW transmitting direction. Further, the fix areas 27, 28 are located between the fix areas 9, 10 in the SAW transmitting direction.

For example, a thickness of the adhesion layer 8 in the fix area 27, 28 is set thicker than the deformation dimension of the center 4a of the diaphragm part 4. Therefore, when the diaphragm part 4 is deformed, the center 4a of the diaphragm part 4 does not contact the sensor chip 3. Thus, load is applied from the diaphragm part 4 only to the fix areas 27, 28.

Figure 17:
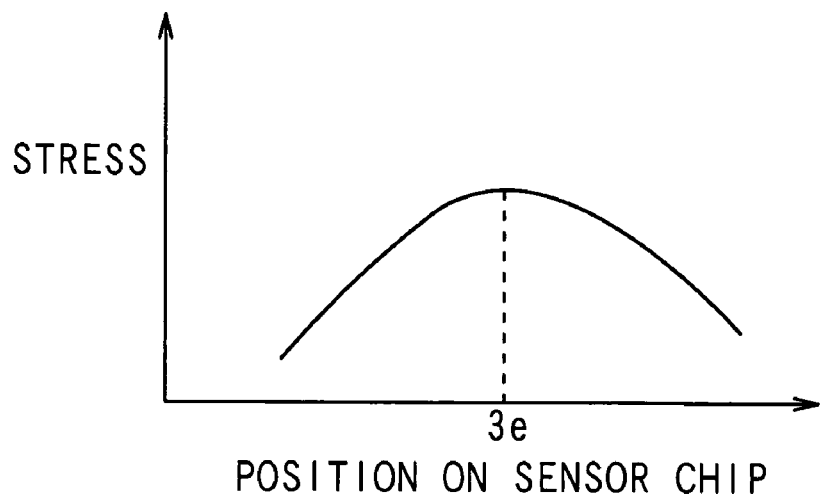
FIG. 17 is a graph illustrating stress distribution of a sensor chip of the pressure sensor of the eighth embodiment.
Figure 18:
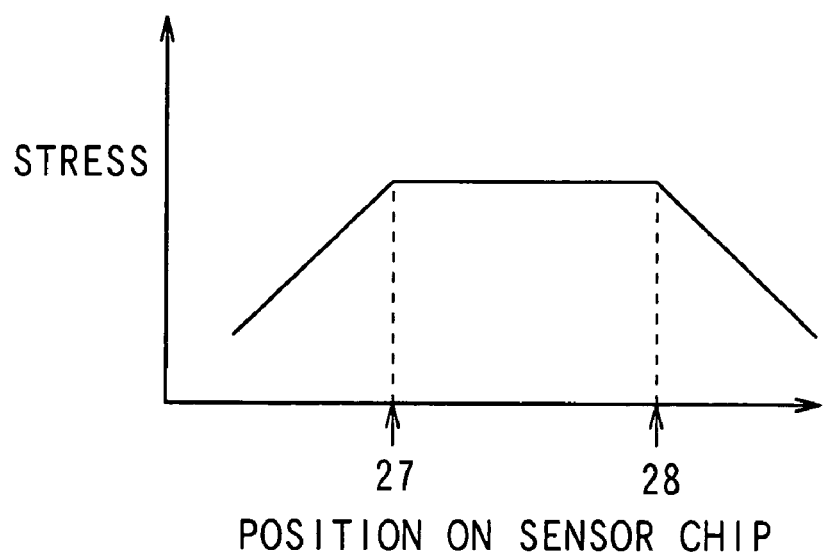
FIG. 18 is a graph illustrating stress distribution of a sensor chip of the pressure sensor of the ninth embodiment.

FIG. 17 shows a stress distribution of the sensor chip 3 of the eighth embodiment when pressure is received. Further, FIG. 18 shows a stress distribution of the sensor chip 3 of the ninth embodiment when pressure is received.

The pressure sensor 1 of the eighth embodiment shown in FIG. 15 has a single load point corresponding to the center 3e of the sensor chip 3, when the diaphragm part 4 is deformed. Therefore, the stress applied to the sensor chip 3 has the distribution shown in FIG. 17. A horizontal axis of FIG. 17 represents a position in the sensor chip 3 shown in FIG. 15 in the SAW transmitting direction. The stress is the largest in the center 3e of the sensor chip 3, and becomes smaller toward ends of the sensor chip 3.

Therefore, distribution is generated in the variations of the electrode interval of the electrode 7 and the acoustic velocity, in the pressure sensor 1 shown in FIG. 15. In this case, a Q-value representing a stability of oscillation becomes worse as the resonator, such that a stability of the oscillation frequency may be lowered.

In contrast, in the ninth embodiment, the load point is constructed by the two fix areas 27, 28, when the diaphragm part 4 is deformed. As shown in FIG. 18, the stress distribution becomes uniform between the two fix areas 27, 28, compared with a case in which the load point is constructed by a single point.

According to the ninth embodiment, the comb-teeth electrode 7 is located in the uniform stress area. Therefore, distribution can be restricted from being generated in the variations of the electrode interval of the electrode 7 and the acoustic velocity.

The sensor chip 3 is larger than the diaphragm part 4, and the fix areas 9, 10 are located on the periphery part 5 of the diaphragm structure 2, in the ninth embodiment. Alternatively, the sensor chip 3 may be smaller than the diaphragm part 4, and the fix areas 9, 10 may be located on the diaphragm part 4 of the diaphragm structure 2.

Tenth Embodiment

Fix positions between a sensor chip 3 and a diaphragm structure 2 are changed in a tenth embodiment, compared with the first embodiment.

Figure 19:
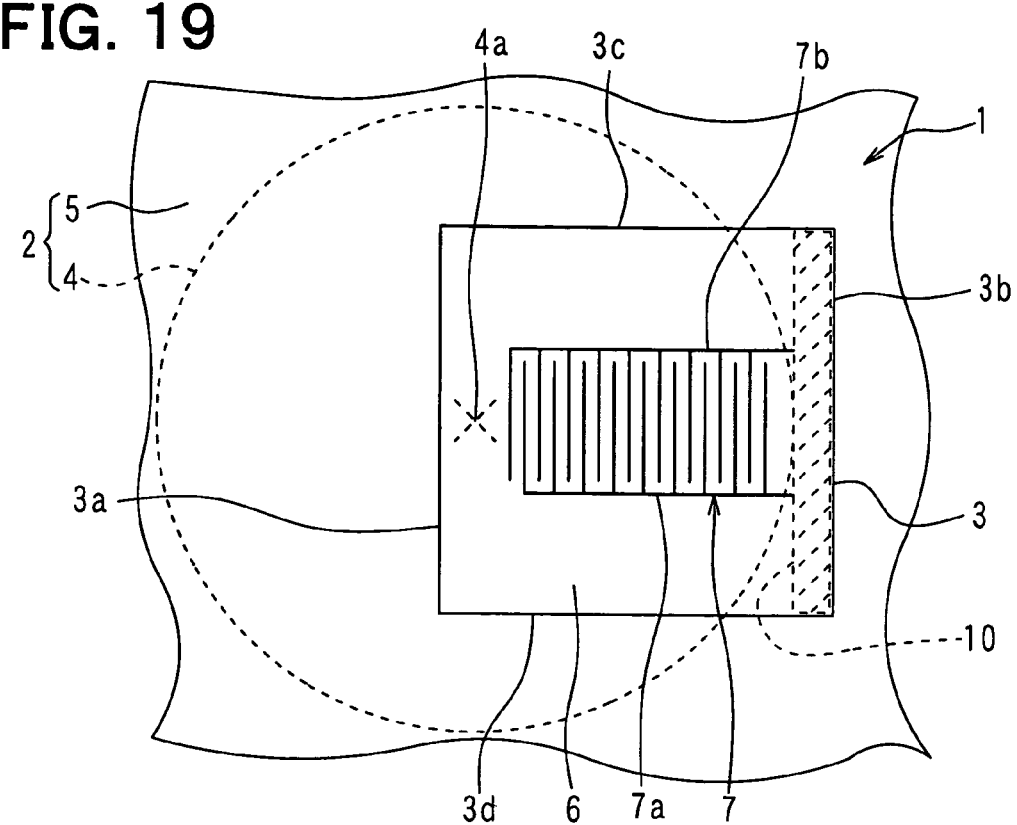
FIG. 19 is a schematic plan view illustrating a pressure sensor according to a tenth embodiment.

As shown in FIG. 19, the sensor chip 3 has the same size and shape as the first embodiment. A position of the sensor chip 3 is moved toward the periphery part 5 from the center 4a of the diaphragm part 4, compared with the first embodiment. For example, the left side 3a of the sensor chip 3 parallel to the comb-teeth part of the electrode 7 is located adjacent to the center 4a of the diaphragm part 4. The right side 3b of the sensor chip 3 parallel to the comb-teeth part of the electrode 7 is located on the periphery part 5.

A fix area 10 is arranged only in a single end portion of the sensor chip 3 in the SAW transmitting direction. For example, the fix area 10 is arranged only in the single end portion adjacent to the right side 3b. The fix area 10 extends over the sensor chip 3 in the perpendicular direction, and is positioned on the periphery part 5 of the diaphragm structure 2.

Thus, the sensor chip 3 has a cantilever structure relative to the diaphragm structure 2. When the diaphragm part 4 is deformed, load is applied from the diaphragm part 4 to the other end portion of the sensor chip 3 in the SAW transmitting direction. The other end portion of the sensor chip 3 opposes to the center 4a of the diaphragm part 4, and is defined as a load point.

Stress is not applied between the load point and the fix area 10 corresponding to a support part. As shown in FIG. 19, the electrode 7 is arranged between the load point and the support part. Alternatively, the electrode 7 may be arranged to overlap with the load point or the support part, when a periphery part of the electrode 7 corresponding to the overlap part has little influence relative to the resonation frequency.

When a pressure is applied to a lower side of the diaphragm part 4, the diaphragm part 4 is deformed upward, and a part of the sensor chip 3 corresponding to the center 4a of the diaphragm part 4 is lifted. Therefore, compressing stress is applied to the top face of the sensor chip 3 in the SAW transmitting direction. Thus, a direction of shifting the resonation frequency in the tenth embodiment is opposite from that in the first embodiment.

At this time, the force restraining the sensor chip 3 by the diaphragm structure 2 in the perpendicular direction is restricted to be small, but a tensile stress is applied to the sensor chip 3 in the perpendicular direction.

According to the tenth embodiment, the variation of the resonation frequency due to the tensile stress in the perpendicular direction does not cancel but increases the variation of the resonation frequency due to the compressing stress in the SAW transmitting direction. Thus, the pressure detecting sensitivity of the sensor chip 3 can be improved.

The fix area 10 is located on the periphery part 5. Alternatively, the fix area 10 may be located on the diaphragm part 4. In this case, a position of the sensor chip 3 relative to the diaphragm structure 2 may correspond to a position shown in FIG. 19. Alternatively, the whole of the sensor chip 3 may be located completely inside of the diaphragm part 4, similarly to the first embodiment.

The other end portion of the sensor chip 3 opposite from the fix area 10 in the SAW transmitting direction is located to oppose to the center 4a of the diaphragm part 4. Therefore, the other end portion is defined as the load point. Alternatively, the load point may be offset from the other end portion.

Eleventh Embodiment

The sensor chip 3 further has a fix area 9 in an eleventh embodiment, compared with the tenth embodiment.

Figure 20:
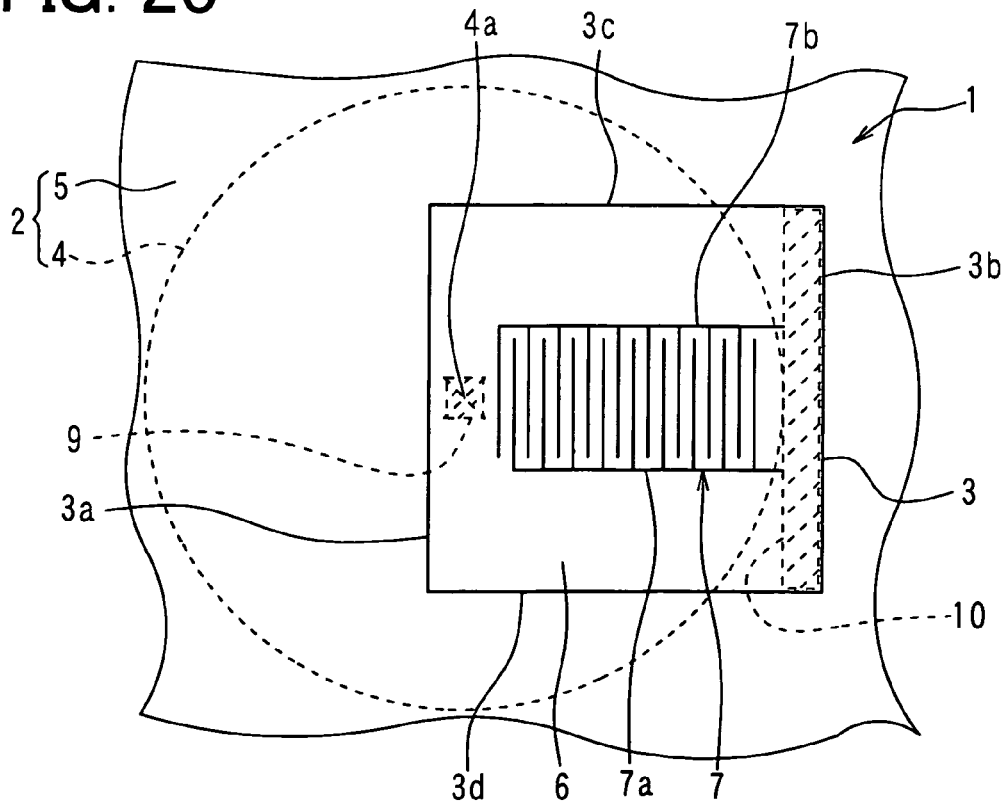
FIG. 20 is a schematic plan view illustrating a pressure sensor according to an eleventh embodiment.

As shown in FIG. 20, the fix area 9 is arranged in the other end portion of the sensor chip 3 opposite from the fix area 10 in the SAW transmitting direction. The fix area 9 is located to oppose to the center 4a of the diaphragm part 4. Further, a dimension of the fix area 9 in the SAW transmitting direction is approximately equal to that in the perpendicular direction. An outside part of the sensor chip 3 outside of the fix area 9 in the perpendicular direction is a non-fix area in which the sensor chip 3 and the diaphragm part 4 are separated from each other.

According to the eleventh embodiment, the fix area 9 is arranged at the load point receiving the load from the diaphragm part 4. Therefore, the pressure detecting sensitivity of the sensor chip 3 can be improved, similarly to the sixth embodiment.

Twelfth Embodiment

Positions of the fix area 10 and the electrode 7 are changed in a twelfth embodiment, compared with the tenth embodiment.

Figure 21:
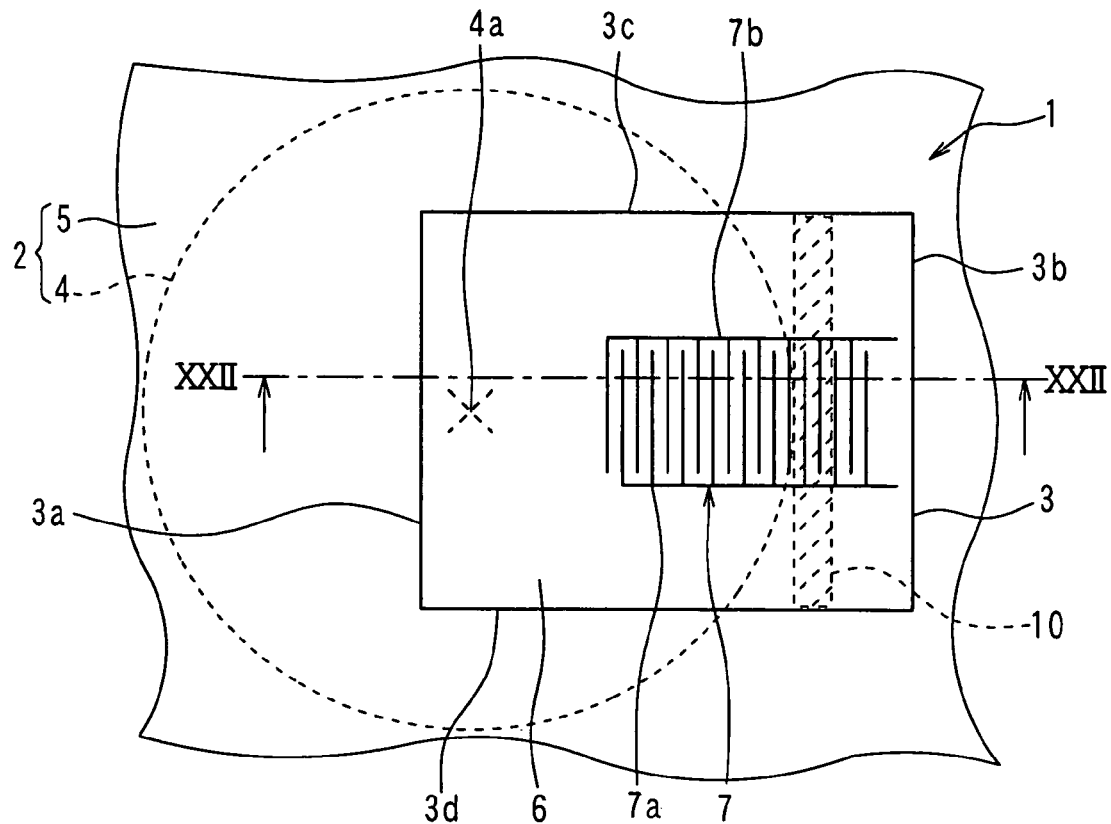
FIG. 21 is a schematic plan view illustrating a pressure sensor according to a twelfth embodiment.

As shown in FIG. 21, a center part of the electrode 7 in the SAW transmitting direction is located adjacent to the fix area 10, and is distanced from the center 4a of the diaphragm part 4. A shape of the sensor chip 3 is extended rightward in FIG. 21, compared with FIG. 19. That is, a dimension of the sensor chip 3 in the SAW transmitting direction is made longer in accordance with the location change of the electrode 7.

Figure 22:
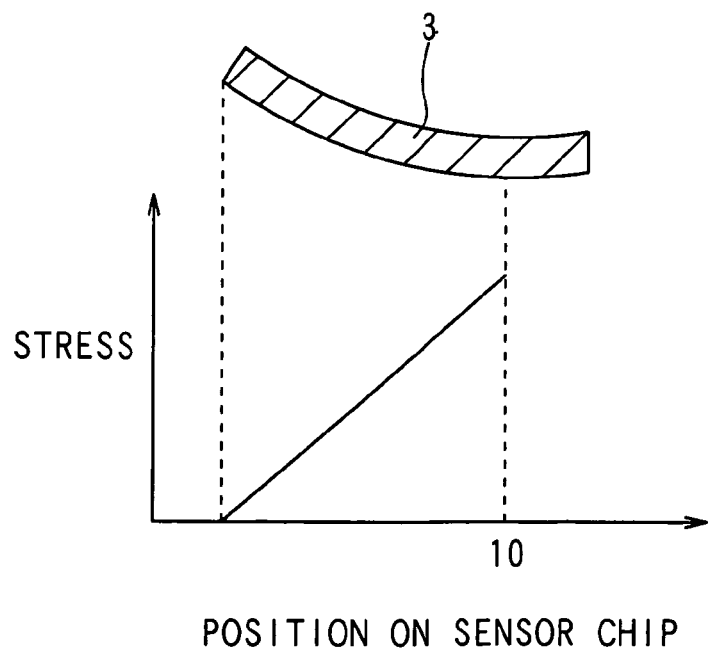
FIG. 22 is a graph, illustrating stress distribution of a sensor chip of the pressure sensor of the twelfth embodiment, the stress distribution corresponding to a cross-sectional view taken along line XXII-XXII of FIG. 21.

FIG. 22 shows a cross-sectional view taken along line XXII-XXII of FIG. 21 of the deformed sensor chip 3 and a distribution of stress applied to the sensor chip 3. In a case that the sensor chip 3 has a cantilever structure relative to the diaphragm structure 2, stress becomes smaller at a position adjacent to the load point of the sensor chip 3 opposing to the center 4a, and stress becomes larger at a position adjacent to the fix area 10, as shown in FIG. 22.

According to the twelfth embodiment, the center part of the electrode 7 is located adjacent to a position of the sensor chip 3 having the largest stress when the diaphragm part 4 is deformed. Therefore, the pressure detecting sensitivity of the sensor chip 3 can be improved.

Thirteenth Embodiment

A fix position of the sensor chip 3 is changed in a thirteenth embodiment, compared with the first embodiment.

Figure 23:
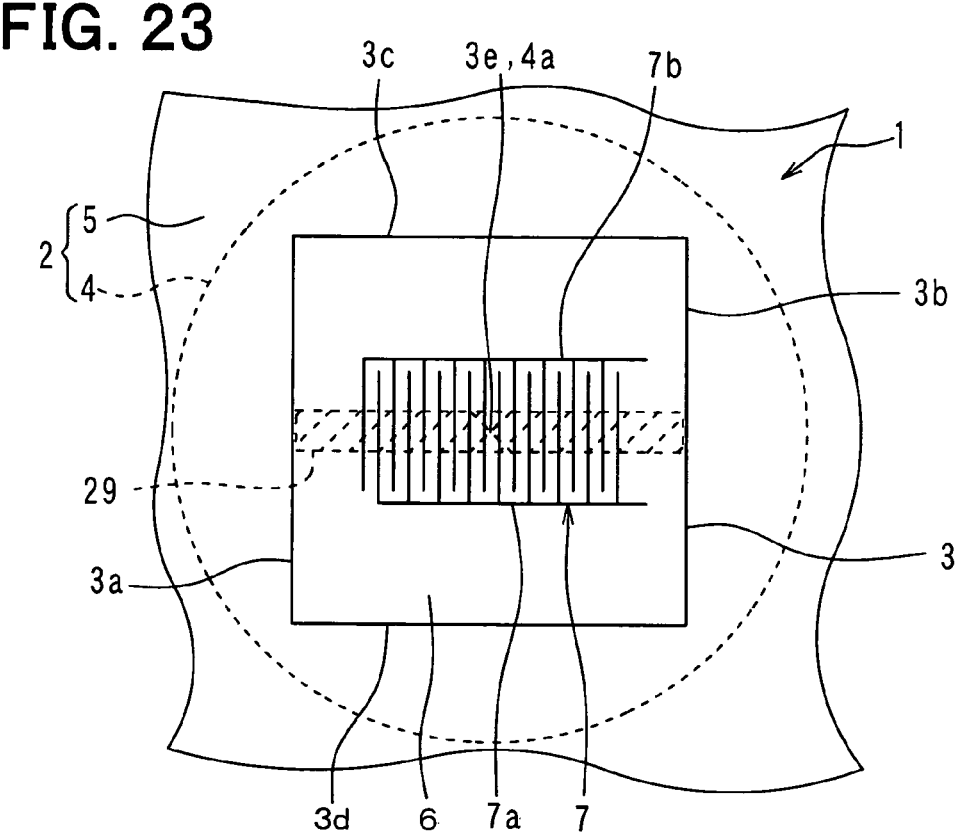
FIG. 23 is a schematic plan view illustrating a pressure sensor according to a thirteenth embodiment.

As shown in FIG. 23, a fix area 29 is arranged to have a linear shape extending in the SAW transmitting direction. The fix area 29 passes through a position of the sensor chip opposite to the center 4a of the diaphragm part 4, and has an elongated shape successive from a first end to a second end in the SAW transmitting direction.

According to the thirteenth embodiment, the fix area 29 is arranged at only a center part of the sensor chip 3 in the perpendicular direction. Therefore, an outside part of the sensor chip 3 outside of the center part in the perpendicular direction is a non-fix area, in which the sensor chip 3 is separated from the diaphragm part 4. Therefore, the perpendicular direction stresses P2 can be reduced, and the pressure detecting sensitivity of the sensor chip 3 can be improved, similarly to the fourth embodiment.

Fourteenth Embodiment

A pattern of the electrode 7 is changed in a fourteenth embodiment, compared with the first embodiment.

Figure 24:
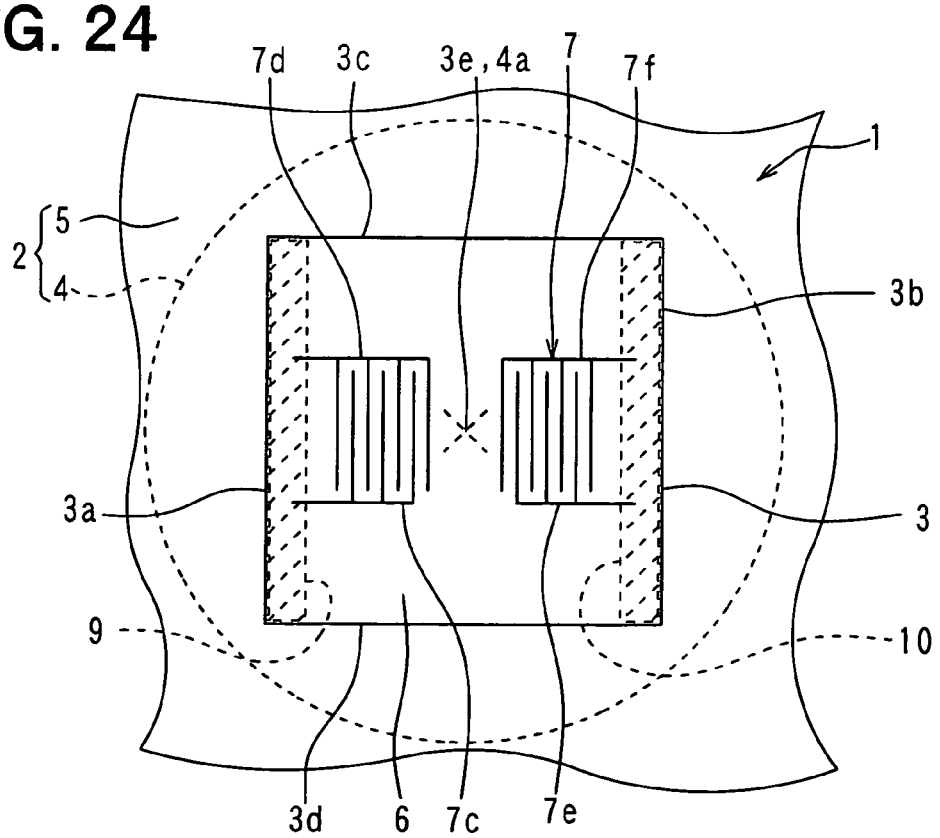
FIG. 24 is a schematic plan view illustrating a pressure sensor according to a fourteenth embodiment.

The electrode 7 is defined in a manner that SAW element operates as a filter element. As shown in FIG. 24, for example, a pair of comb-teeth electrodes 7c, 7d and a pair of comb-teeth electrodes 7e, 7f are arranged on a substrate 6. The pair of comb-teeth electrodes 7c, 7d are used for an input side, and the pair of comb-teeth electrodes 7e, 7f are used for an output side.

In the above embodiments, the SAW element operates as a resonator, and pressure is detected by a variation of the resonation frequency. In contrast, in the fourteenth embodiment, when the SAW element operates as a resonator, pressure may be detected by a variation of a delay time.

Fifteenth Embodiment

Construction of a pressure sensor is changed in a fifteenth embodiment, compared with the above embodiments.

Figure 25:
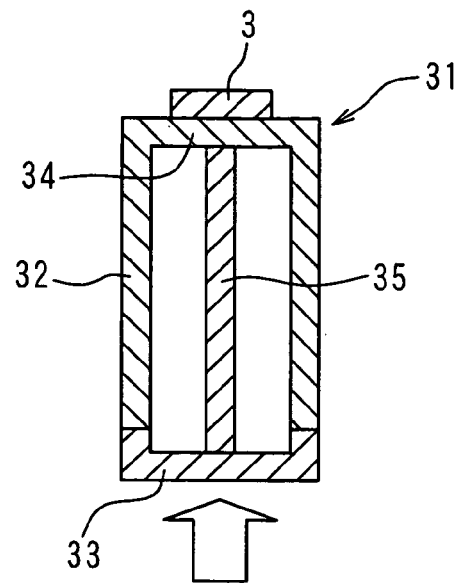
FIG. 25 is a schematic cross-sectional view illustrating a pressure sensor according to a fifteenth embodiment.

As shown in FIG. 25, a pressure sensor 31 includes a hollow tube-shaped case 32, a diaphragm part 33, a membrane-shaped strain part 34, a pressure transmitting part 35 and a sensor chip 3, similarly to the pressure sensor disclosed in JP-A-2007-114094. The diaphragm part 33 is arranged on an end of the case 32 so as to receive pressure. The strain part 34 is arranged on the other end of the case 32. The pressure transmitting part 35 is arranged in a hollow part of the case 32. The sensor chip 3 is arranged on the strain part 34. Pressure received by the diaphragm part 33 is transmitted to the strain part 34 and the sensor chip 3 through the pressure transmitting part 35. Thus, the pressure sensor 31 detects the pressure.

The case 32, the diaphragm part 33, and the strain part 34 are made of metal such as stainless steel. The case 32 has a tube-shape, and outlines of the diaphragm part 33 and the strain part 34 are approximately round. The pressure transmitting part 35 has a bar-shape, and is made of metal such as stainless steel, or ceramics. The sensor chip 3 is the same as that of the first embodiment, but all the face of the sensor chip 3 opposing to the strain part 34 is fixed to the strain part 34.

Figure 26:
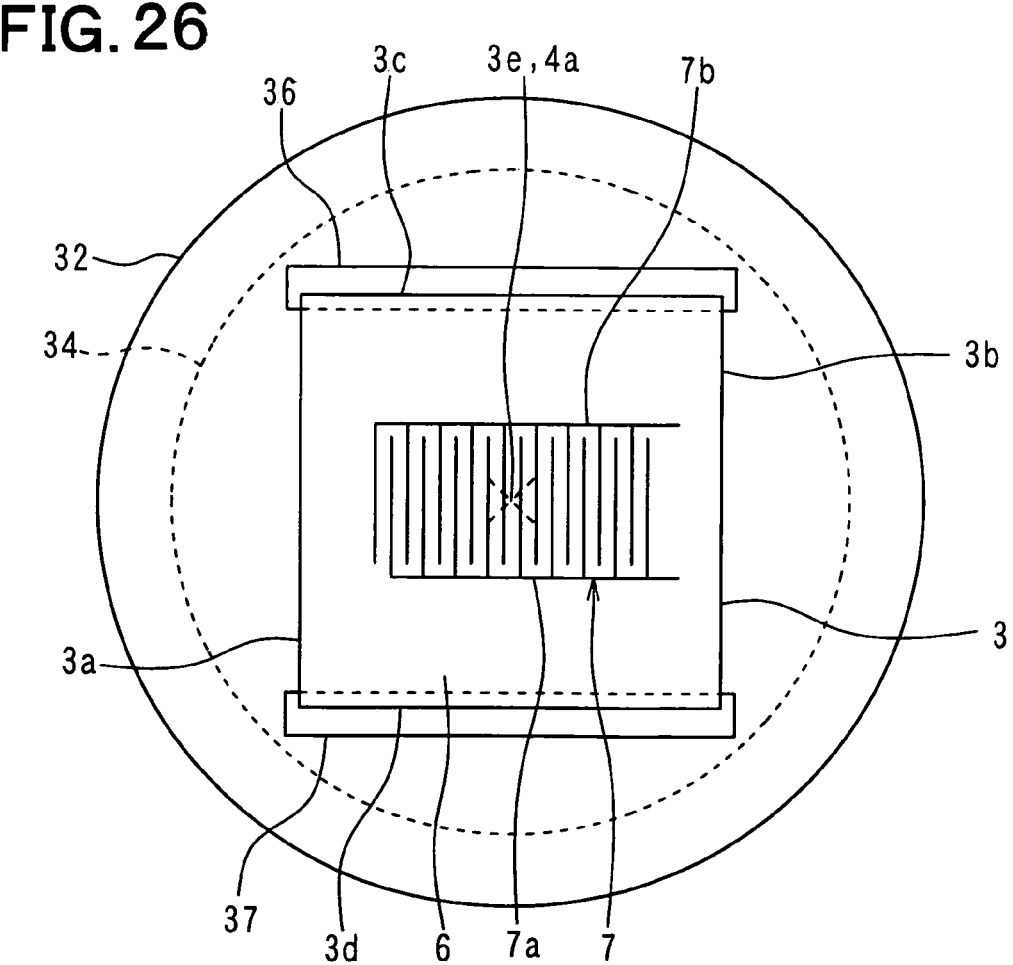
FIG. 26 is a schematic plan view illustrating the pressure sensor of the fifteenth embodiment.

As shown in FIG. 26, the strain part 34 has openings 36, 37 in positions corresponding to a side 3c and a side 3d of the sensor chip 3. The sides 3c, 3d are perpendicular to the comb-teeth part of the electrode 7. The openings 36, 37 are defined through the strain part 34, and formed by using a punching process, for example.

Thus, sides 3a, 3b of the sensor chip 3 are supported by the strain part 34. When the diaphragm part 33 receives pressure, stress applied to the sensor chip 3 in the perpendicular direction becomes small due to the openings 36, 37. According to the fifteenth embodiment, the pressure detecting sensitivity of the sensor chip 3 can be improved, similarly to the first embodiment.

When the pressure sensor 31 includes the diaphragm part 33 and the pressure transmitting part 35, gas-tightness is not necessary for the strain part 34. In this case, the forming of the openings 36, 37 is effective.

Sixteenth Embodiment

The construction of the pressure sensor 31 of the fifteenth embodiment is changed in a sixteenth embodiment.

Figure 27:
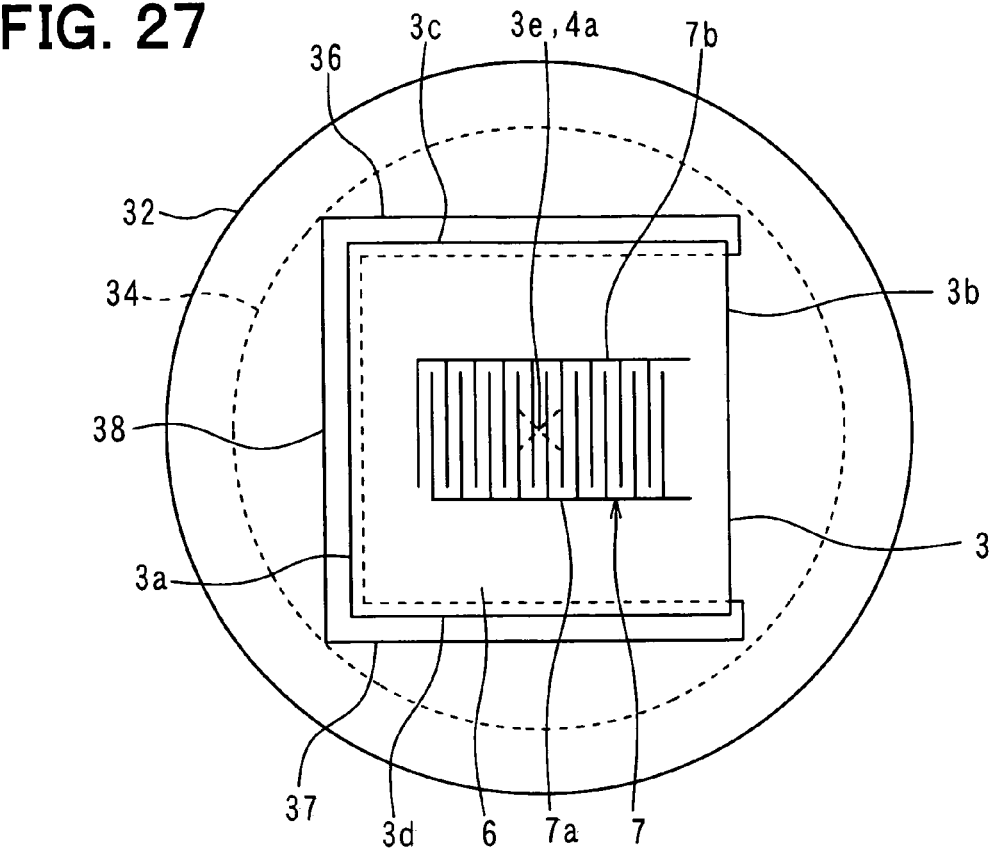
FIG. 27 is a schematic plan view illustrating a pressure sensor according to a sixteenth embodiment.

As shown in FIG. 27, the strain part 34 further has an opening 38 in a position corresponding to a side 3a of the sensor chip 3, compared with FIG. 26. The side 3a is parallel to the comb-teeth part of the electrode 7. The opening 38 is connected to the openings 36, 37.

The punching process is performed to positions of the strain part 34 corresponding to the three sides 3a, 3c, 3d of the sensor chip 3. In this case, a cantilever structure is defined by the sensor chip 3 and the strain part 34.

Other Embodiment

In the above embodiments, the fix areas 9, 10 are arranged on the end portions of the sensor chip 3 in the SAW transmitting direction, or the fix area 10 is arranged on one of the end portions of the sensor chip 3 in the SAW transmitting direction. Alternatively, the fix area 9, 10 may be distanced from the end portion toward the center 3e of the sensor chip 3. That is, the fix area 9, 10 is located on a position between the center 3e and an end of the sensor chip 3.

When the fix areas are arranged on both of the end-adjacent positions in the SAW transmitting direction, the fix areas are located to oppose to each other through the electrode, similarly to the first embodiment.

In the above embodiments, the 128° Y-cut X-direction-propagating lithium niobate substrate is used as the substrate 6 of the sensor chip 3. However, the substrate 6 is not limited to the 128° Y-cut X-direction-propagating lithium niobate substrate. The substrate 6 may be other substrate having a relationship that the variation direction of the resonation frequency due to the transmitting direction stress is opposite from that due to the perpendicular direction stress.

In the first to ninth embodiments, the center 3e of the sensor chip 3 overlaps with the center 4a of the diaphragm part 4. Alternatively, the center 3e of the sensor chip 3 may not overlap with the center 4a of the diaphragm part 4.

For example, in the fifth embodiment, the fix area 21 is arranged on the center 3e of the sensor chip 3. However, when the center 3e of the sensor chip 3 does not overlap with the center 4a of the diaphragm part 4, the fix area 21 is arranged on a position of the sensor chip 3 corresponding to the center 4a of the diaphragm part 4.

In the above embodiments, the sensor chip 3 is arranged on the top face of the diaphragm part 4 or the strain part 34. Alternatively, the sensor chip 3 may be arranged on a back face of the diaphragm part 4 or the strain part 34.

In the above embodiments, the sensor chip 3 has a rectangular shape, and the diaphragm part 4 and the strain part 34 have round shapes. Alternatively, the sensor chip 3 may have other shape, and the diaphragm part 4 and the strain part 34 may have other shape.

In the above embodiments, the pressure sensor is used for detecting the engine combustion pressure. Alternatively, the pressure sensor may be used for detecting other pressure. Further, the pressure sensor may be a load sensor.

The above embodiments may be combined with each other in a possible way. Such changes and modifications are to be understood as being within the scope of the present invention as defined by the appended claims.

What is claimed is:

1. A surface acoustic wave pressure sensor comprising:
    a diaphragm structure having a diaphragm part to be distorted by receiving pressure; and
    a sensor chip having
        a substrate to generate surface acoustic wave, and
        a comb-teeth electrode arranged on the substrate, the electrode transmitting the wave through the substrate in a single wave transmitting direction, wherein
    the sensor chip is fixed to the diaphragm structure through a predetermined fix area so as to detect the pressure received by the diaphragm part,
    the fix area is defined on only a part of the sensor chip opposing to the diaphragm structure,
    the sensor chip is restrained by the diaphragm structure in the wave transmitting direction,
    the sensor chip has flexibility in a direction approximately perpendicular to the wave transmitting direction,
    the flexibility in the perpendicular direction is larger than that in the wave transmitting direction.

2. The surface acoustic wave pressure sensor according to claim 1, wherein
    the fix area is located on at least one of a first side and a second side located opposite from each other through a center of the sensor chip in the wave transmitting direction,
    the sensor chip has an outside area located outside of a position to oppose to a center of the diaphragm part in the perpendicular direction, and
    the outside area of the sensor chip is separated from the diaphragm part.

3. The surface acoustic wave pressure sensor according to claim 1, wherein
    the fix area is arranged on both end portions of the sensor chip in the wave transmitting direction.

4. The surface acoustic wave pressure sensor according to claim 3, wherein
    the diaphragm structure has a periphery part located on a periphery of the diaphragm part,
    the periphery part has a distortion smaller than a distortion of the diaphragm part, when the diaphragm part receives pressure,
    the sensor chip is arranged on both of the diaphragm part and the periphery part, and
    the fix area arranged on the both end portions of the sensor chip is positioned on the periphery part.

5. The surface acoustic wave pressure sensor according to claim 3, wherein
    the fix area is further arranged on a position of the sensor chip opposing to a center of the diaphragm part.

6. The surface acoustic wave pressure sensor according to claim 3, wherein
    the fix area is further arranged on two positions of the sensor chip opposing to each other through the electrode in the wave transmitting direction, and
    the two positions are located between the both end portions in the wave transmitting direction.

7. The surface acoustic wave pressure sensor according to claim 1, wherein
    the fix area is arranged on a first end portion of the sensor chip in the wave transmitting direction.

8. The surface acoustic wave pressure sensor according to claim 7, wherein
    the diaphragm structure has a periphery part located on a periphery of the diaphragm part, the periphery part has a distortion smaller than a distortion of the diaphragm part, when the diaphragm part receives pressure, the first end portion of the sensor chip is arranged on the periphery part, the sensor chip further has a second end portion opposite from the first end portion in the wave transmitting direction, the second end portion is arranged on the diaphragm part, and the fix area is located on the periphery part.

9. The surface acoustic wave pressure sensor according to claim 7, wherein the fix area is further arranged on a position of the sensor chip opposing to a center of the diaphragm part.

10. The surface acoustic wave pressure sensor according to claim 1, wherein the fix area has an elongated shape extending between ends of the sensor chip in the wave transmitting direction, and passing through a position opposing to a center of the diaphragm part.

11. The surface acoustic wave pressure sensor according to claim 1, wherein the fix area is arranged on both end portions of the sensor chip in the wave transmitting direction, and the fix area is arranged in a manner that an area defined by an outline of the fix area has an elongated shape in the wave transmitting direction.

* * * * *